(12) United States Patent
Smith

(10) Patent No.: US 6,181,235 B1
(45) Date of Patent: Jan. 30, 2001

(54) ROTARY APPARATUS

(75) Inventor: James Andrew Timothy Smith, Grantham (GB)

(73) Assignee: Ultra Electronics Limited, Greenford (GB)

( * ) Notice: Under 35 U.S.C. 154(b), the term of this patent shall be extended for 0 days.

(21) Appl. No.: 08/793,694

(22) PCT Filed: Sep. 4, 1995

(86) PCT No.: PCT/GB95/02082

§ 371 Date: May 28, 1997

§ 102(e) Date: May 28, 1997

(87) PCT Pub. No.: WO96/07588

PCT Pub. Date: Mar. 14, 1996

(30) Foreign Application Priority Data

Sep. 2, 1994 (GB) .................................................. 9417639

(51) Int. Cl.[7] ................................ H04B 1/00; B63H 1/14
(52) U.S. Cl. .............................. 340/310.01; 340/870.3; 340/870.33; 340/595; 340/671; 340/672; 340/686.3; 341/192; 219/483; 244/134 R; 310/114; 416/95
(58) Field of Search .......................... 340/310.01, 870.3, 340/870.33, 870.39, 640, 595, 679, 671, 672, 686.3, 825.25, 114; 341/192; 219/201, 202, 240, 250, 244, 482, 483, 486, 493; 244/134 A, 134 R; 416/245 R, 245 A, 155, 95; 310/114, 115, 67 R

(56) References Cited

U.S. PATENT DOCUMENTS

| | | | |
|---|---|---|---|
| 4,292,502 | * 9/1981 | Adams | 219/483 |
| 5,144,299 | 9/1992 | Smith | 340/870.18 |
| 5,558,495 | * 9/1996 | Parker et al. | 416/95 |
| 5,793,137 | * 8/1998 | Smith | 310/114 |

FOREIGN PATENT DOCUMENTS

| | | |
|---|---|---|
| 0530612 | 3/1993 | (EP) . |
| 2281273 | 3/1976 | (FR) . |
| 2671650 | 7/1992 | (FR) . |
| 2264812 | 9/1993 | (GB) . |

* cited by examiner

Primary Examiner—Donnie L. Crosland
(74) Attorney, Agent, or Firm—Baker Botts, L.L.P.

(57) ABSTRACT

A rotary apparatus in which at least one electrically controlled device is attached to a rotor. The rotor carries coils such that rotation of the rotor generates power for the device. A switch is provided for controlling the supply of power to the device and receives control signals via a contactless communication link.

12 Claims, 4 Drawing Sheets

ROTARY APPARATUS

TECHNICAL FIELD

This invention relates to rotary apparatus incorporating electrically powered devices and a method and means for controlling the supply of power to said devices. In particular, the invention relates to propellers incorporating a de-icing system.

Aircraft propeller de-icing systems comprise heating devices mounted on the leading edges of propeller blades and switching means to control the application of power to these heating devices so that they are energised periodically to melt the boundary layer of ice and allow the remaining ice to break free under the effect of centrifugal and aerodynamic forces. Continuous operation of the heating devices is not desirable because this causes continuous melting of ice, which runs back onto the blade and re-freezes on aerodynamically critical working surfaces.

It is known to incorporate a permanent magnet electrical generator in the propeller hub so that rotation of the propeller generates the power supplied to the heating devices on the blades.

In GB2264812, we proposed a propeller de-icing system including a permanent magnet electrical generator in the hub to supply power to a switching circuit rotating with the hub and which includes a distributor switch and the heating devices and the distributor switch is controlled by a timer on the hub, which is controlled in turn by a control signal supplied to it via a rotary connection from the aircraft on which the propeller is mounted.

DISCLOSURE OF THE INVENTION

An object of the present invention is to provide an improved propeller de-icing system; in particular, a system which avoids electrical contacts between the propeller and the airframe on which it is mounted, and which allows operation of the heating devices to be monitored and controlled accordingly.

According to the present invention, power is switched to one or more electrically powered devices on a rotor by providing switching means on the rotor responsive to a control signal to supply power to said devices, and said control signal is supplied to the switching means via a contactless communication link between the rotor and structure on which the rotor is rotatably mounted.

Preferably, the rotor incorporates an electrical generator with inductive windings in which power is generated by rotary motion of the rotor, and the communication link comprises an inductive link incorporated in the generator. For example, with a permanent magnet electrical generator, windings may be provided on the rotor to generate an induced voltage when rotating relative to fixed magnets, and these same windings, or separate windings, may then be used as said inductive communication link by further inducing a modulated voltage or current using a control signal in a winding on the magnets.

The control signal is preferably an encoded binary signal and the switching means includes decoding means to decode the control signal. In this way, control signals can be addressed to individual switching means, each controlling operation of a separate device. For example, in the case of a propeller de-icing system, the heating devices on different blades can be separately controlled.

Additionally, the same communication link or a similar link may be used to transmit performance information from the rotor to a controller, and the controller may be adapted to respond to said performance information by transmitting appropriate control signals to the switching means. For example, in the case of a propeller de-icing system, the current and voltage in individual heating devices may be monitored and appropriate information transmitted to a de-icing controller.

In an alternative embodiment of the invention, the contactless communication link between the rotor and the structure on which it is mounted comprises a radio frequency link or an optical communication link.

DESCRIPTION OF THE DRAWINGS

The invention will now be described by way of example with reference to the accompanying drawings in which.

MODE OF CARRYING OUT THE INVENTION

Figure 1:
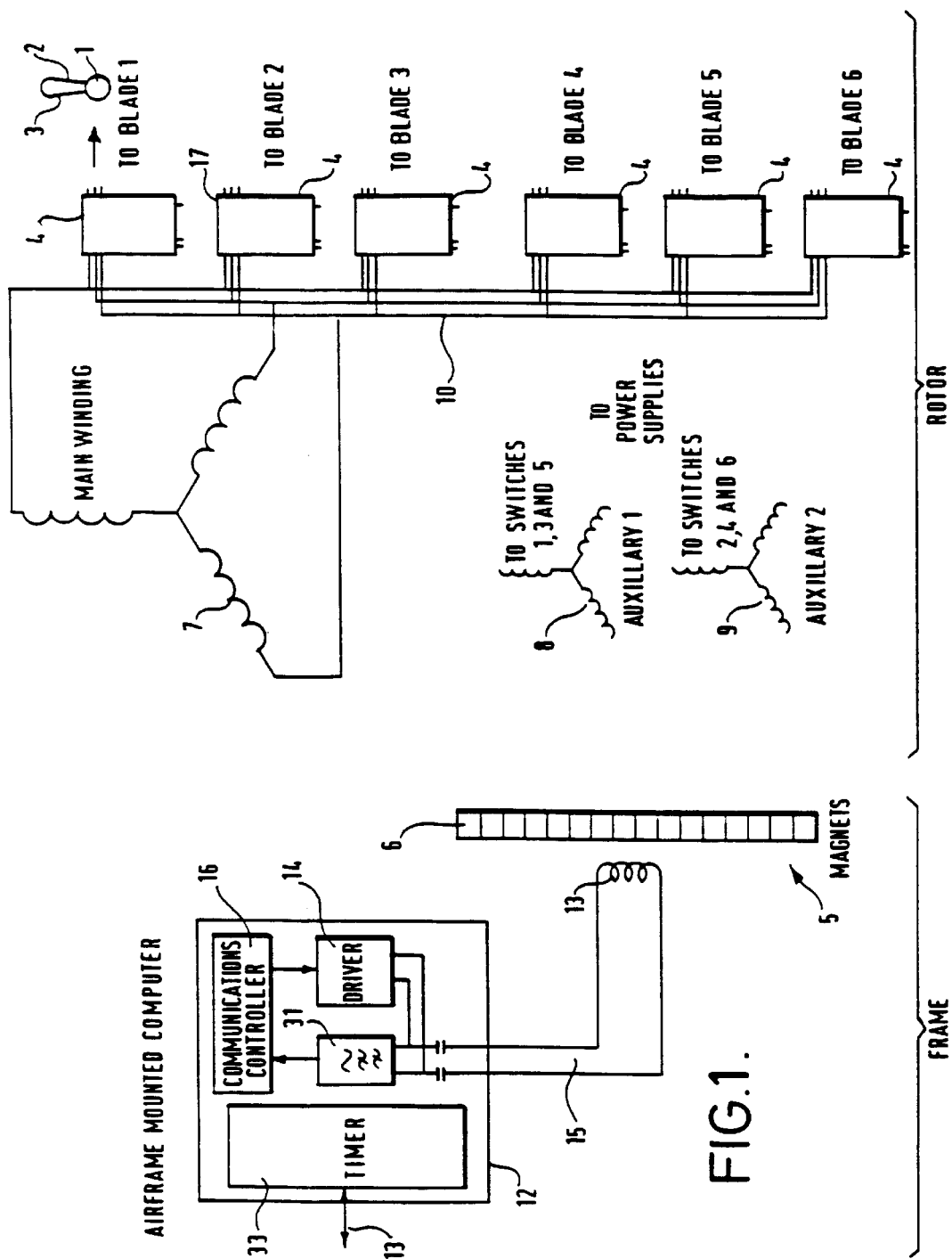
FIG. 1 is a schematic diagram of an aircraft propeller de-icing system according to the invention.
Figure 2:
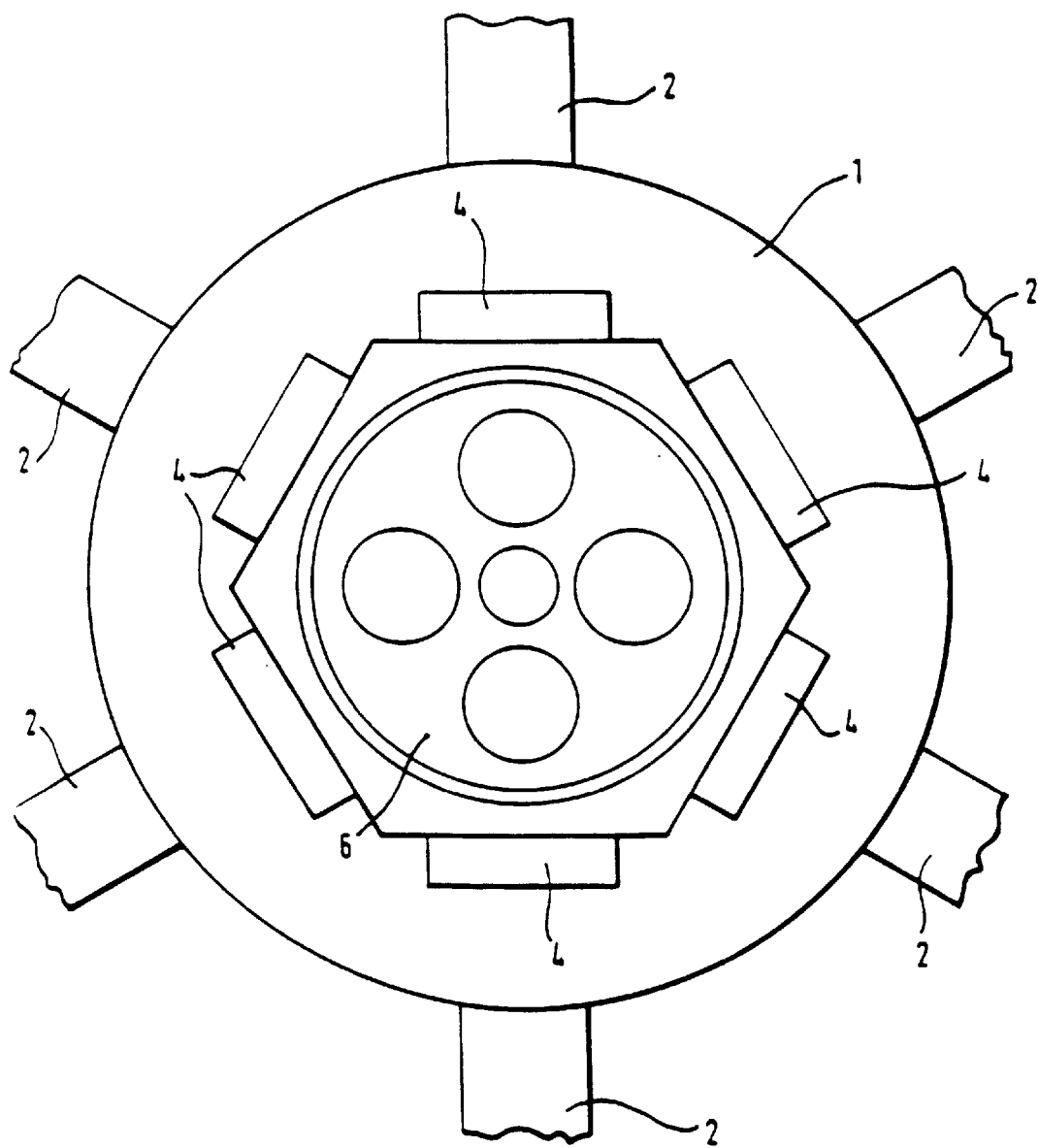
FIG. 2 is a schematic diagram showing the layout of components of the de-icing system of FIG. 1 in relation to a propeller hub.

The hub 1 of an aircraft propeller with six propeller blades 2 projecting radially from it, is shown in outline in FIG. 2. Each blade has a de-icing heater 3 (FIG. 1) fitted along its leading edge. Electrical power is supplied to each heater under the control of a respective power switching unit 4 which is mounted on the back-plate of the hub 1. Electrical power for the heaters 3 and switching units 4 is generated by a permanent magnet generator 5 comprising an annular array of permanent magnets 6 mounted adjacent the back-plate of the hub 1 on the engine gearbox carrying the propeller. Three star-connected, three phase winding 7,8,9 (FIG. 1) are mounted on the back-plate of the hub 1 so that a voltage is induced therein by rotation relative to the magnets 6. One of these windings 7 has a 200 volt output and is connected via a bus 10 to each of the switching units 4 to provide the power supply to the heaters 3. Each of the other windings 8,9 has a 28 volt output and is connected via connections 11 to three of the switching units 4 to supply power to their operating circuits. In the example illustrated, one winding 8 supplies power to the switching units controlling power to heaters 3 on the first, third and fifth blades in the direction of rotation, and the other winding 9 supplies power to the switching units controlling power to the heaters on the second, fourth and sixth blades in the direction of rotation. A control unit 12 mounted on the airframe controls operation of the switching units 4 by control signals transmitted via a winding 13 on the magnets 6 which modulate the magnetic field and thus the signals induced in the windings 8 and 9.

The control unit 12 shown in FIG. 1 comprises a computer which receives control signals 13 from the aircraft and determines the operating sequence of the heaters 3.

A driver 14 generates a high frequency output signal which is applied via connections 15 to the winding 13 on the magnets 6. The frequency of this output signal is varied by a frequency shift keying technique FSK under the control of a communications controller 16 so that binary control signals are transmitted via the windings 8 and 9 to the switching units 4. The communications protocol employed by the controller 16 allows it to address commands to each of the switching units 4 individually. Also, the protocol preferably incorporates error checking techniques in order to ensure safe operation.

Figure 3:
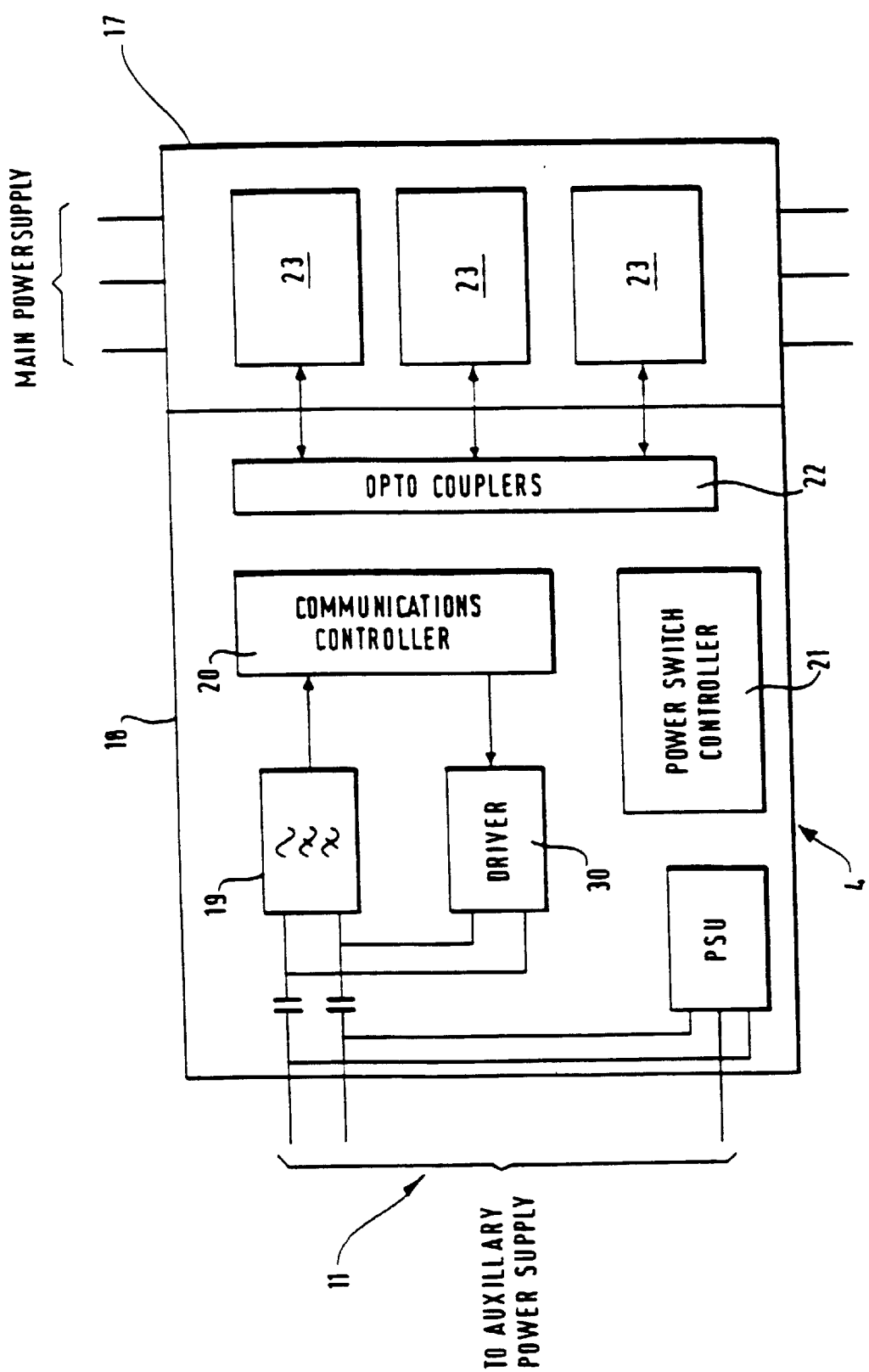
FIG. 3 is a schematic diagram of a power switching unit controlling the supply of power to a respective heating device in the system of FIG. 1.
Figure 4:
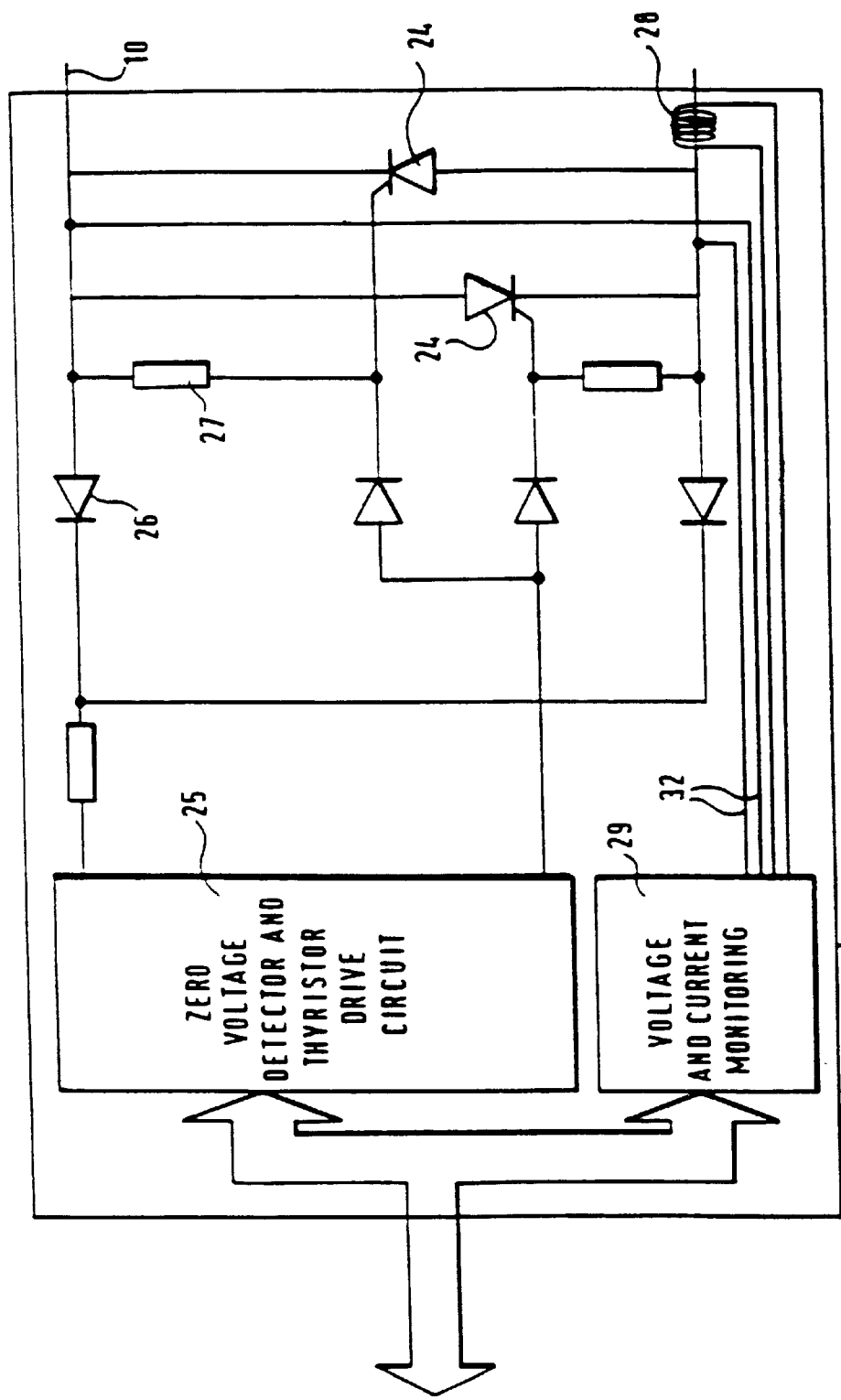
FIG. 4 is a schematic diagram of a single phase power switch and monitoring means of the power switching unit of FIG. 3.

Each switching unit, as shown in FIG. 3, comprises a three phase, switching section 17, and a control section 18 which receives and decodes the control signals from the windings 8 and 9. A high pass filter 19 passes the FSK signal to a communications controller 20, which decodes the signal and detects commands addressed to it. Commands to operate the heaters 3 are passed to a power switch controller 21 which passes appropriate control signals to the switching section 17 via optical couplers 22.

The switching section 17 comprises three solid state switches 23 each controlling connection of a respective phase of the power supply 7 via one of the bus conductors 10 to a respective heater 3. Each switch 23 comprises a pair of thyristors 24 connected back-to-back to pass current in the bus conductor 10 in either direction, control circuitry including a zero voltage detector and thyristor drive circuit 25,26,27.

Each solid state switch 23 also incorporates a sensor winding 28 which is inductively coupled to the respective conductor 10 through which the power supply is being controlled, and this generates a corresponding sensor signal that is picked up in the monitoring circuit 29 and used to monitor the current in the bus conductor 10. The monitoring circuit 29 also monitors the voltage on the bus conductor 10 via a pair of electrical tappings 32. The monitoring circuit 29 passes the sensor signal via the optical couplers 22 to the communications controller 20 in the control section 18 of the switch 23. The controller 20 encodes this sensor signal in a high frequency signal using FSK and this encoded sensor signal is transmitted by a driver circuit 30 via the respective winding 8 or 9 and the winding 13 on magnets 6 back to the control unit 12 in the aircraft. A high pass filter 31 passes the encoded sensor signal to the communications controller 16, which decodes the signal to determine the voltage and current in the bus conductor 10.

The control unit 12 processes the current and voltage information from the switching sections 17 of all six switching units 4 in order to monitor performance of the system and to adapt operation of the system if necessary. For example the switching sequence of the three phases controlled by a switching unit 4 may be changed if one of the solid state switches 23 fails. Additionally, the power output for each heater 3 can be assessed and adjusted individually by controlling the on-off cycle times of the solid state switches 23 using a timer 33. In this way, the system can compensate for variations in air temperature and output of the generator 5.

These sensor signals from the switching units 4 may be transmitted periodically or on demand as commanded by a control signal from the control unit 12.

It will be appreciated that the control unit 12 can be adapted to control energisation of the heaters 3 in any desired sequence to suit operating conditions.

In the illustrated example, the rotor takes the form of an aircraft propeller with six blades and power is switched periodically to de-icing heaters on each blade. However, it will be appreciated that the propeller may have any number of blades, and the de-icing heaters may be anti-icing heaters on the blades or other de-icing or anti-icing devices such as electro expulsive and impulsive electric devices that remove ice by mechanical shock. In another embodiment of the invention, the electrically powered devices on an aircraft propeller may comprise a pitch control mechanism which serves to control the pitch of one or more blades of the propeller.

In yet other embodiments of the invention, the rotor on which the electrically powered devices are mounted may comprise a vehicle wheel and the devices may comprise sensors or actuators. Alternatively, the rotor may comprise an electrical generator and the devices may comprise switches that control excitation of further generator windings. Furthermore, different modulated frequencies may be used for the communications signal.

What is claimed is:

1. A rotary apparatus incorporating at least one electrically powered device on a propeller, the apparatus comprising an electrical generator having inductive windings carried for rotation with the propeller, switching means on the propeller responsive to a control signal to supply the at least one electrically powered device, and fixed permanent magnets, in which the inductive windings co-operate with the fixed permanent magnets to generate an induced voltage when the propeller rotates relative to the fixed magnet, the control signal is supplied to the switching means via a contactless inductive communication link between the propeller and a structure on which the rotor is rotatably mounted, the inductive windings comprise part of the communication link and a control winding is provided on the magnets and in use the control winding is modulated with a control signal to transmit data over the communication link.

2. An apparatus as claimed in claim 1, characterized by a controller for controlling the supply of power to the at least one electrically powered device, the controller having a connection to the control winding for transmitting control signals by modulating the control signal in the control winding.

3. An apparatus as claimed in claim 1, characterized in that the control signal is an encoded binary signal and the switching means includes decoding means to decode the control signal.

4. An apparatus as claimed in claim 1, characterised in that a contactless communication link is used to transmit performance information from the rotor (12) to a controller (12), and the controller (12) is arranged to respond to the performance information by transmitting appropriate control signals to the switching means (4).

5. An apparatus as claimed in claim 1, characterized in that the rotary apparatus is a propeller hub carrying a plurality of propeller blades and the at least one electrically power device is a heating element provided on each propeller blade.

6. An apparatus as claimed in claim 4, characterized in that the rotary apparatus is a propeller hub carrying a plurality of propeller blades, the at least one electrically powered device is a heating element provided on each propeller blade, and at least one of the voltage and current supplied to each individual heating element is monitored and appropriate information transmitted to the controller.

7. An apparatus as claimed in claim 1, characterised in that the switch means are electrically controllable switches.

8. A rotary apparatus incorporating at least one electrically powered device on an aircraft rotor, the apparatus comprising an electrical generator having inductive windings carried for rotation with the rotor, switching means on the rotor responsive to a control signal to supply the at least one electrically powered device, and fixed permanent magnets, in which the inductive windings co-operate with the fixed permanent magnets to generate an induced voltage when the rotor rotates relative to the fixed magnets, the control signal is supplied to the switching means via a contactless inductive communication link between the rotor and a structure on which the rotor is rotatably mounted, the inductive windings comprise part of the communication link and a control winding is provided on the magnets and in use the control winding is modulated with a control signal to transmit data over the communication link.

9. An apparatus as claimed in claim 8, characterized by a controller for controlling the supply of power to the at least one electrically powered device, the controller having a connection to the control winding for transmitting control signals by modulating the control signal in the control winding.

10. An apparatus as claimed in claim 8, characterized in that a contactless communication link is used to transmit performance information from the rotor to a controller and the controller is arranged to respond to the performance information by transmitting appropriate control signals to the switching means.

11. An apparatus as claimed in claim 8, characterized in that the rotary apparatus is a propeller hub carrying a plurality of propeller blades and the at least one electrically powered device is a heating element provided on each propeller blade.

12. An apparatus as claimed in claim 8, characterized in that the switch means are electrically controllable switches.

* * * * *